L. B. TALBERT.
POWER TRANSMISSION MECHANISM.
APPLICATION FILED JUNE 9, 1919.

1,360,597.

Patented Nov. 30, 1920.
2 SHEETS—SHEET 1.

INVENTOR
Lewis B. Talbert.

BY B. F. Wheeler
ATTORNEY

L. B. TALBERT.
POWER TRANSMISSION MECHANISM.
APPLICATION FILED JUNE 9, 1919.
1,360,597.
Patented Nov. 30, 1920.
2 SHEETS—SHEET 2.
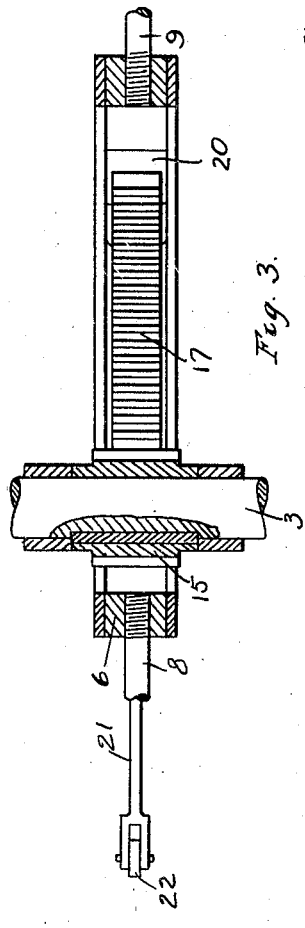
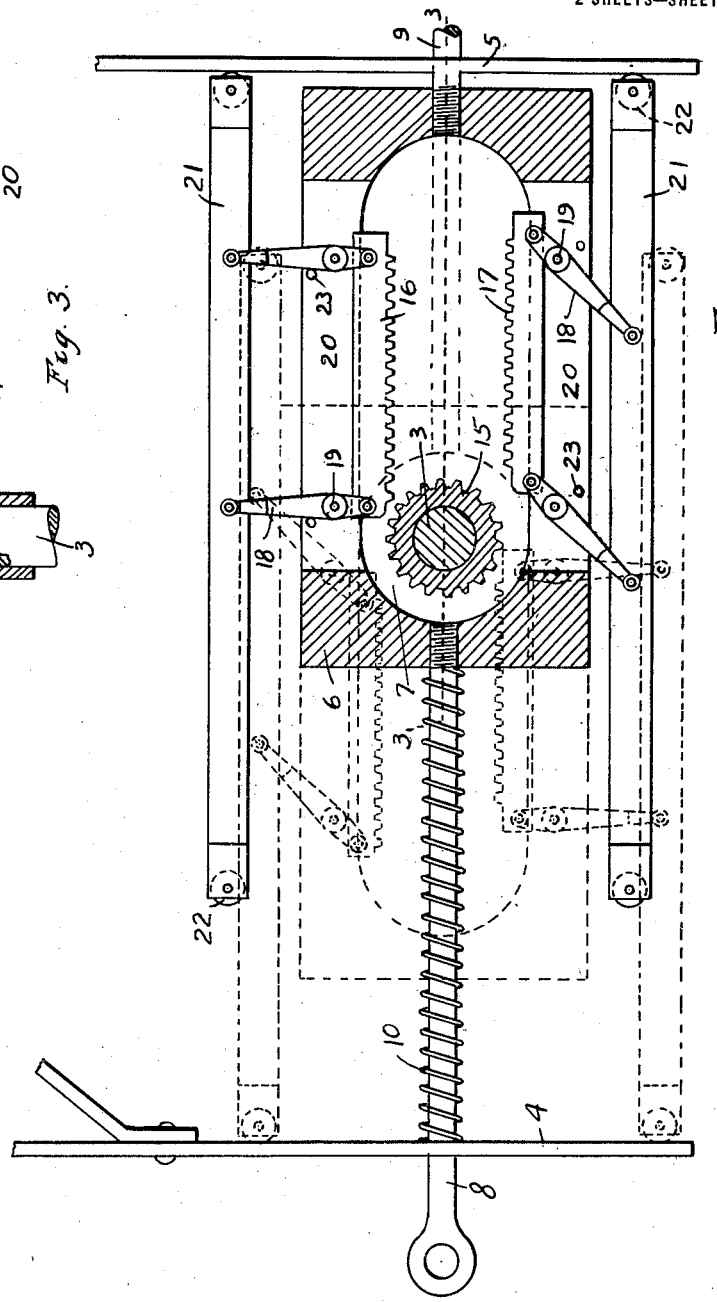
INVENTOR
Lewis B. Talbert
BY
ATTORNEY

UNITED STATES PATENT OFFICE.

LOUIS B. TALBERT, OF DETROIT, MICHIGAN, ASSIGNOR OF ONE-HALF TO HOWARD W. SOPER, OF WALKERVILLE, ONTARIO, CANADA.

POWER-TRANSMISSION MECHANISM.

1,360,597.   Specification of Letters Patent.   Patented Nov. 30, 1920.

Application filed June 9, 1919. Serial No. 302,706.

*To all whom it may concern:*

Be it known that I, LOUIS B. TALBERT, a citizen of the Dominion of Canada, residing at Detroit, in the county of Wayne and State of Michigan, have invented a new and useful Power-Transmission Mechanism, of which the following is a specification.

This invention relates to power transmission mechanism, and more particularly to mechanisms for converting reciprocating motion into rotary motion.

It is an object of the invention to eliminate " dead center " positions in a mechanism for converting reciprocating motion into rotary motion, and a further object is to maintain a constant leverage acting from the reciprocating member upon the rotating member, rather than the continuously varying leverage that characterizes the common crank and pitman drive mechanism.

More specifically, it is the object of the invention to provide a rack and pinion mechanism adapted to drive the pinion in a constant direction upon reciprocation of the rack member.

An application of the invention to a child's vehicle for propelling the same is described in the following specification and illustrated in the accompanying drawings, wherein, Figure 1 is a view of said vehicle in side elevation.

Fig. 2 is a longitudinal vertical sectional view of the propelling mechanism of said vehicle.

Fig. 3 is a horizontal sectional view of said mechanism, the section being taken upon line 3—3 of Fig. 2.

Figure 1:
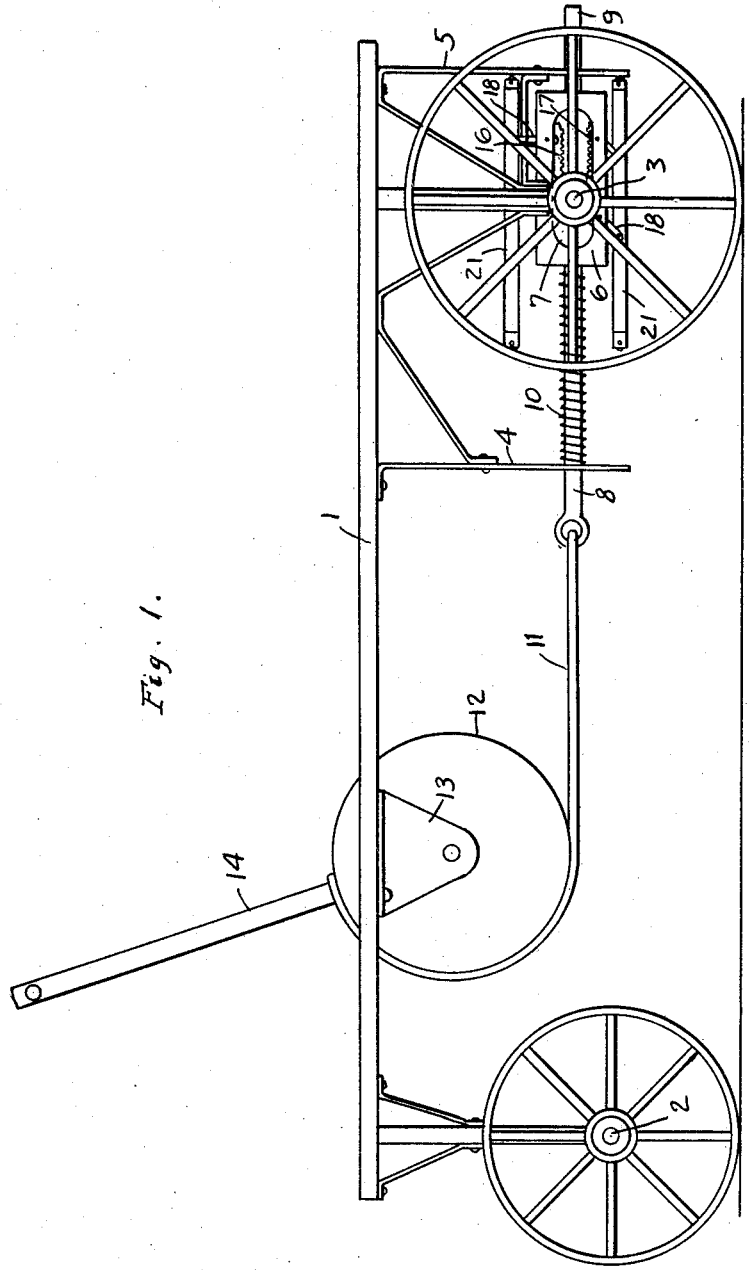

In these views the reference character 1 designates the platform of a child's wheeled vehicle, of which the front and rear axles are designated respectively at 2 and 3. Brackets 4 and 5 depend from the rear portion of said platform, the former in front and the latter behind the rear axle 3. Between said brackets there is adapted to reciprocate a member 6 formed with a large slot 7 through which the axle 3 passes with ample clearance. A pair of alined guide rods 8 and 9 project respectively from the front and rear ends of the member 6 and slidably engage the brackets 3 and 4, and upon the front guide rod 3 there is coiled a spring 10 whereby the member 6 is returned to its rear limiting position after each forward stroke. To actuate said member forwardly a cable 11 or some other suitable flexible connection is secured to the free end of the forward guide rod 8 and is extended forwardly therefrom to a pulley or drum 12 journaled between brackets 13 beneath the front portion of the platform. A lever 14 projects upwardly from the pulley 13 and is operable by the rider of the vehicle to rock the pulley 12 to alternately wind the cable 11 upon said pulley and permit unwinding of the pulley with the rearward movement of the member 6. Within the slot 7 a pinion 15 is mounted fast upon the rear axle, which pinion is alternately engageable by upper and lower racks 16 and 17. Each of these racks is supported by a pair of levers 18 pivoted at 19 upon the member 6, said member having slots 20 communicating with the slot 7 and opening respectively in its top and bottom faces, in which slots said levers are mounted. Respectively above and below the member 6, horizontal bars 21 are located, the upper of said bars being pivotally carried by the levers which support the upper rack and the lower bar being carried by the levers which support the lower rack. 22 are rollers mounted in the ends of the bars 21, and 23 are stop pins projecting from the member 6 within the slots 20 to limit the swinging movement of the levers 18.

In the operation of the above-described mechanism, the member 6 is reciprocated by the rider of the vehicle as hereinbefore explained. During the forward stroke of said member the position of the racks 16 and 17, levers 18 and bars 21, is as shown in full lines in Fig. 2, the upper pair of levers 18 being vertical and the corresponding rack 16 being in its lower limiting position, and adapted to engage and actuate the pinion 15. The lower pair of levers 18 are inclined and consequently maintain the corresponding rack 17 in a position to clear the pinion 15 during forward travel. Engagement of the upper levers 18 with the pins 23 resists the tendency exerted upon the rack 16 by the pinion to swing said levers beyond the vertical. As the rack 16 disengages the pinion 15, after having meshed throughout its length with said pinion, the forward ends of the bars 21 impinge against the bracket 4, stopping further advance of said bars, and acting to shift said bars and the levers 18 and racks 16 and 17 to the positions shown in dash line in Fig. 2. In such positions the upper rack is in a position to clear the pinion during the rearward stroke and the lower rack is positioned to engage the pinion and to actuate the same during said stroke in the same direction as did the upper rack upon the forward stroke. As the lower rack disengages the pinion the bars 21 abut against the rear bracket 5 and thus there is effected movement of the parts from their dash line to their full line positions. (See Fig. 2.) The rollers 22 decrease the resistance arising from contact of the bars 21 with the brackets 4 or 5 while undergoing their slight vertical travel.

It is evident from the above description and explanation that the mechanism disclosed is one which avoids the existence of dead center positions, and in which the leverage applied to the rotating member is always equal to the full pitch diameter of the pinion.

While the invention is disclosed as applied to a child's vehicle, it is to be understood that the invention is applicable wherever it is desired to transform reciprocating motion into rotary motion with a maximum efficiency.

What I claim is:

1. In a power transmission mechanism, a pinion, a frame mounted to reciprocate transversely of the axis of said pinion, a pair of opposed racks respectively engageable with said pinion at opposite points, a pair of levers pivoted upon the frame and carrying each of said racks, a bar substantially parallel to said racks pivotally connected to each pair of levers, and abutments engageable by the ends of said bars at the ends of the stroke adapted to swing said levers by means of said bars to alternate engagement of the racks with the levers on every stroke.

2. In a power transmission mechanism, a pinion, a frame mounted to reciprocate transversely of the axis of the pinion, a pair of opposed racks adapted to engage opposite points of said pinion, a pair of levers pivoted upon the frame and carrying each of said racks, means for actuating said levers at each end of the stroke to reversely shift the racks with respect to the pinion, whereby the pinion is driven alternately by the two racks in a constant direction, and abutments for said levers upon said frame resisting swinging of the levers while the corresponding rack engages the pinion.

In testimony whereof I sign this specification.

LOUIS B. TALBERT.